United States Patent [19]

Majewski

[11] 4,189,056
[45] Feb. 19, 1980

[54] KNOCK-DOWN PORTABLE SHOPPING RACK

[76] Inventor: Elmer J. Majewski, 9436 Crawford Ave., Skokie, Ill. 60076

[21] Appl. No.: 909,440

[22] Filed: May 25, 1978

[51] Int. Cl.² ............................................. A47F 5/01
[52] U.S. Cl. .................................... 211/195; 211/181; 220/19; 224/42.42
[58] Field of Search ................. 211/181, 71, 106, 195, 211/198, 201, 132, 85; 220/19; 224/42.45 R, 29 R, 42.42 R, 42.42 A, 42.45 B, 29 D

[56] References Cited

U.S. PATENT DOCUMENTS

| 1,731,841 | 10/1929 | Burson | 220/19 X |
|---|---|---|---|
| 1,959,454 | 5/1934 | Biescar | 211/85 X |
| 2,016,246 | 10/1935 | Schilling | 220/19 |
| 2,222,974 | 11/1940 | Bow | 211/195 X |
| 2,524,900 | 10/1950 | Einhorn | 220/19 X |
| 2,951,671 | 9/1960 | Roehrig | 211/71 X |
| 3,043,441 | 7/1962 | Dumford | 211/181 X |
| 3,314,549 | 4/1967 | Goldreich et al. | 211/181 X |
| 3,388,808 | 6/1968 | Radek | 211/132 |
| 3,404,783 | 10/1968 | Whitman et al. | 211/132 X |
| 4,029,244 | 6/1977 | Roberts | 220/6 X |

FOREIGN PATENT DOCUMENTS

| 1937140 | 2/1971 | Fed. Rep. of Germany | 224/42.45 B |
|---|---|---|---|
| 1394864 | 3/1965 | France | 211/132 |
| 1397428 | 3/1965 | France | 220/19 |

Primary Examiner—Roy D. Frazier
Assistant Examiner—Robert W. Gibson, Jr.
Attorney, Agent, or Firm—Hill, Van Santen, Steadman, Chiara & Simpson

[57] ABSTRACT

A portable rack sized to fit in the trunk of a car has a back, base, sides and several partitions forming compartments for minimizing the movement of articles placed therein while being transported in a vehicle between point of purchase and point of utilization. All connections between the wire-form or rod-form parts of the rack are hinged so that when not in use or when packaged for shipment or sale the rack can be folded into a compact flat break-down configuration.

2 Claims, 8 Drawing Figures

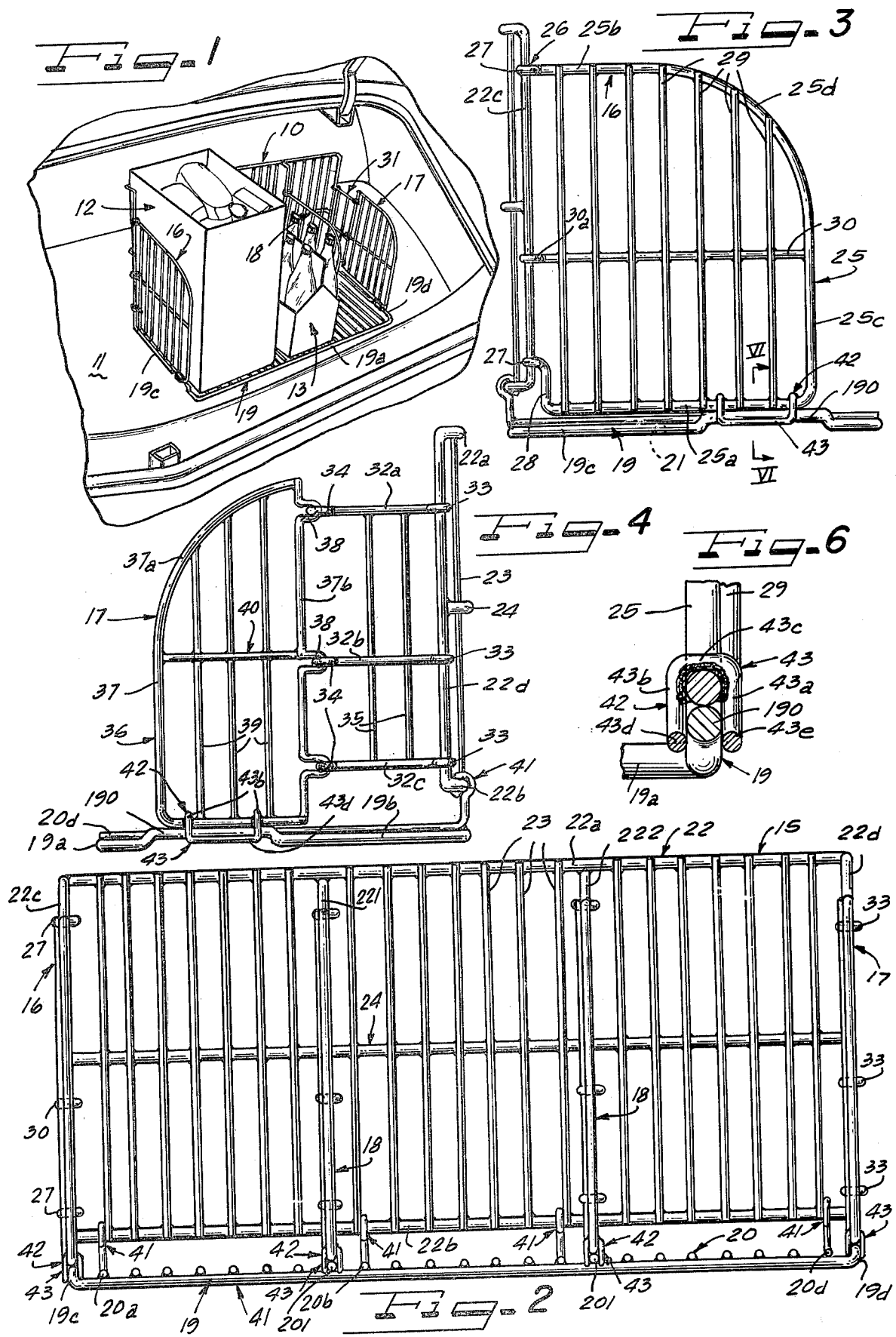

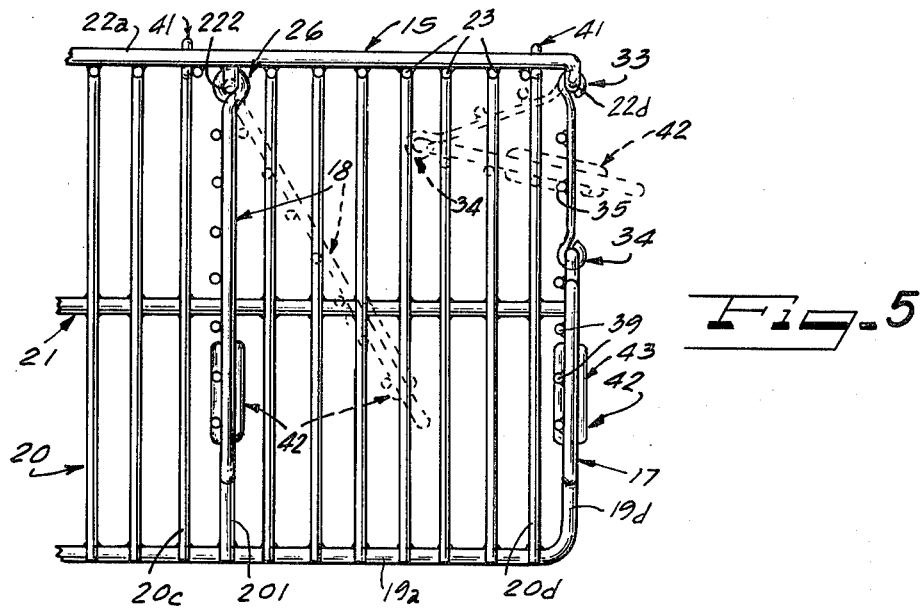
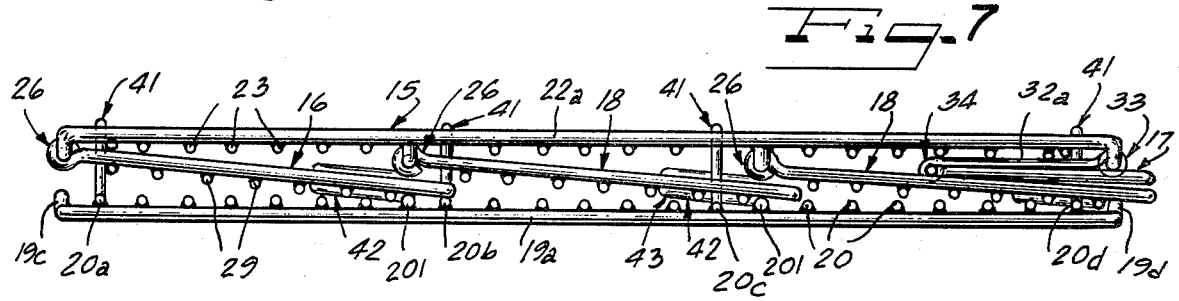
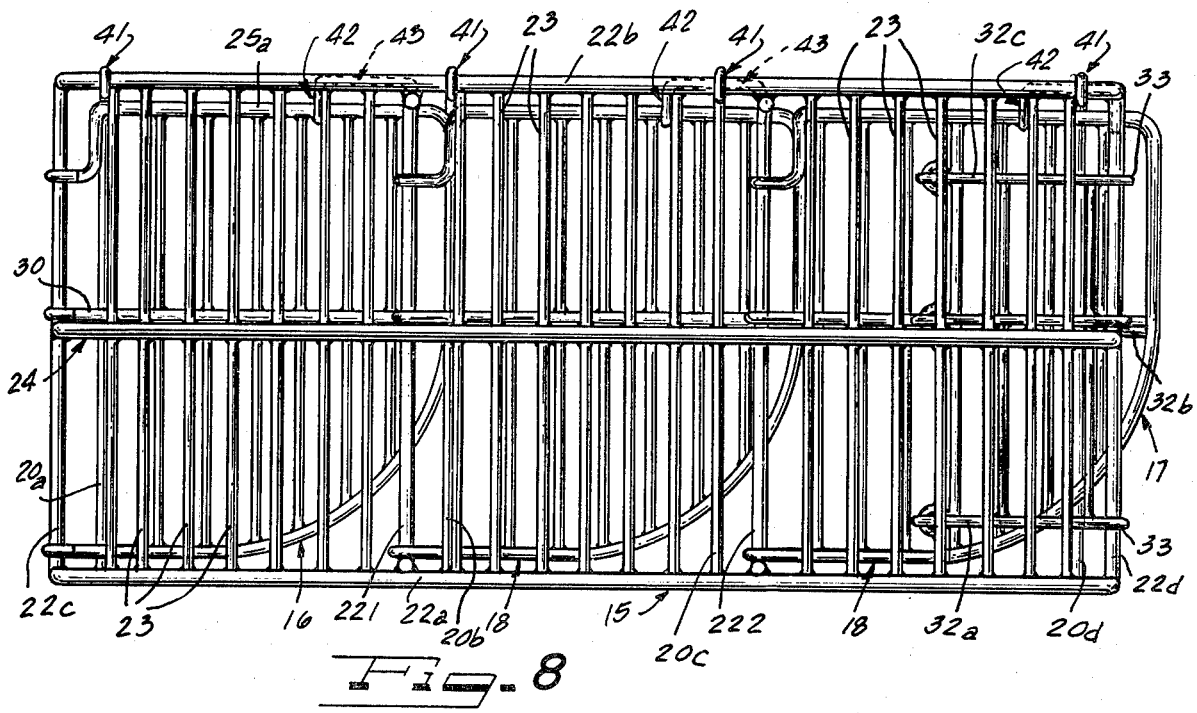

KNOCK-DOWN PORTABLE SHOPPING RACK

BACKGROUND OF THE INVENTION

1. Field of the Invention

The present invention relates generally to portable break-down containers.

2. Prior Art

The forces generated by the driving of a vehicle over rough streets and around corners often cause bagged or packaged items being transported in the relatively open spaces of the vehicle, for example a seat in the occupant's interior or the trunk of a car or the back of a van to shift from their original placement, spilling or damaging their contents and/or the vehicle. Heretofore, store clerks sometimes provide box structures which are capable of surrounding and supporting a number of such items. Such boxes are necessarily space consuming, heavy and cumbersome. Further, when not in use or if use is completed, the box must be disposed of or stored.

SUMMARY OF THE INVENTION

In accordance with the present invention, a portable break-down supporting rack for unstable packages or bagged groceries sized to fit in the ordinary automobile trunk has a base, back, sides and partitions having perimeters formed of bent rods, and which are given supporting ability by a number of rods traversing each of the perimeters. The wall-forming wire or rod parts are hinged together by eye-bolt-like connectors which surround a rod of one part and are joined to another part, allowing pivotal radial movement about the rod. The rack when in use is fixed in rigid form by clips attached to the lower perimeter of the sides and partitions, the clips shaped to accept and hold a rod of the base which is immediately below each of the respective sides and partitions. One of the sides is comprised of two portions hinged on an axis normal to the base, allowing that side to fold inwardly of the rack for a more compact collapsed arrangement for storage.

BRIEF DESCRIPTION OF THE DRAWINGS

FIG. 1 is a perspective view of storage rack placed in an automobile trunk and supporting commonly transported items such as a filled grocery bag and a multi-bottle pack container.

FIG. 2 is a front view of the rack in erected form.

FIG. 3 is an elevational view of one side of the rack.

FIG. 4 is an elevational view of the opposite side of the rack.

FIG. 5 is a plan view of the rack, the solid lines representing a partition and one side in erected form, and the dashed lines showing how those parts move about hinges to fold into a collapsed form.

FIG. 6 is a detailed sectional view taken on line VI—VI of FIG. 3.

FIG. 7 is a front elevational view of the rack in collapsed form.

FIG. 8 is a plan elevational view of the rack in collapsed form.

DESCRIPTION OF THE PREFERRED EMBODIMENTS

The storage rack 10 of the present invention is shown in FIG. 1 placed in an automobile trunk 11. The rack is constructed and arranged to support items commonly transported in such a vehicle, such as a grocery bag 12 and a bottle container 13. Referring to FIG. 2, the rack has a base 14, a back 15, a side 16, a hinged foldable side 17, and two partitions 18. The perimeter 19 of the base is conveniently formed of a metal rod-form member bent in the desired shape of the base, for example, in the shape of a rectangle having longitudinally extending parallel spaced apart legs 19a and 19b joined at opposite ends by transversely disposed legs 19c and 19d. A plurality of rods 20 parallely transversing the shorter dimension of the perimeter are spaced at selected equal intervals parallel to the legs 19c and 19d and are in a longitudinally extending row along the length of the legs 19a and 19b. The rods 20 terminate at the perimeter 19 and are attached to the perimeter legs 19a and 19b at those points. A reinforcing rod 21 traverses the base across the longer dimension between the legs 19c and 19d intersecting approximately at the mid-point of each of the rods 20 and is joined to each as well as to the legs 19c and 19d in order to provide additional strength to the structure.

A selected plurality of rods 20 designated at 20a, 20b, 20c, and 20d traversing the base 14, rather than terminating at the rear portion of the base perimeter, are elongated to provide an integral extension 41 which is bent to extend vertically upward a short distance above the level of the base 14. The end of each extension 41 is bent to form an eye-bolt-shaped loop 42 of such a size so as to snugly surround a rod 22 forming the perimeter of the back 15 in a hinging relation.

The back 15 is constructed in a manner similar to the base 14. Again referring to FIG. 2, the perimeter rod 22 is a rod-form metal member bent in rectangular shape to provide longitudinally extending parallel spaced apart legs 22a and 22b which are traversed by a plurality of spaced apart rods 23 disposed across the shorter dimensions. The rods 23 are affixed at their ends to the legs 22a and 22b. A reinforcing rod 24 traverses the longer dimension of the back 15 intersecting and being joined to each of the rods 23 and connected at opposite ends to legs 22c and 22d. The back reinforcing rod 24 is attached to the legs 22c and 22d at approximately the mid-point of each respective leg.

One of the sides and all of the partitions are constructed as shown in FIG. 3 which specifically illustrates the side 16 of the rack, but its configuration is identical to that of a partition 18 and like reference numerals will be used to identify like parts. A rod 25 forming the perimeter is generally bent into three sides 25a, 25b and 25c of a square, but the upper front quadrant 25d is curved to form an arc of a circle having its center at approximate coincidence with the center of the square. Free end 26 is bent to form an eye-bolt hinge in a manner similar to the hinge connecting the base to the back 15. Each free end 26 of the rod 25 is shaped to form an identical loop 27, loop 27 adapted to snugly surround a short leg 22c or 22d of the back 15.

In order to provide compartmentation which is convenient and of great utility, a pair of struts 221 and 222 are provided at spaced apart points corresponding to the spacing dimension of the usual grocery bag and beverage carrier. Thus a corresponding partition 18 may be connected to each respective strut 221 and 222 at the loop 27.

Because the back is displaced slightly above the base due to the length of vertical extension 41, the hinge of free end 27 must also be displaced slightly upward from the bottom portion of the side. This is accomplished by forming a small vertical leg extension 28 inwardly of the free end of the leg 25a.

The curved front quadrant portions 25d permit the storage rack 10, when supporting smaller items such as bottle container 13, to be placed closer to the rear of the car without prohibiting or interfering with trunk lid closure so the user may minimize the reach in and out of the storage rack to retrieve parcels, packages and bags.

A plurality of spaced apart parallel vertical rods 29 traverse the side 16 and each partition 18. The rods 29 are of varying length so that each terminates at the perimeter 25 and is joined thereto in firm assembly as by welding or the like. A reinforcing rod 30 horizontally traverses the side 16 and each partition 18 and intersects and is joined to each rod 29 at approximately the midpoint thereof. At the inner end, the rod 30 is elongated and is shaped to form a hinge eye 30a which closely embraces an adjacent rod such as 22c or 221 or 222, thereby hinging the member to the back 15.

In order to foreshorten the entire break-down assembly to a convenient size for storage, the end member 17 at one end of the storage rack 10 is comprised of two separate portions 37 and 36 hinged at an axis normal to the base 14 which is approximately midway between the back 15 of the rack 10 and the open front. The rear portion 31 consists of three horizontal rods 32a, 32b and 32c each having eye-bolt-like curved extensions 33 and 34 at opposite ends forming hinges. The eye-bolt extensions 33 hingedly connect to a corresponding adjacent leg 22d. A plurality of spaced parallel vertical rods 35 intersect and join the horizontal rods 32a, 32b and 32c to form a wire form grid constituting the side member 17.

The front portion 36 of side 17 is formed by rod 37 bent generally in the shape of a rectangle, but having a quadrant or curved portion 37a which is disposed on an arc of a circle having its center at approximately the mid-point of a vertical portion 37b of the perimeter. The vertical portion 37b has three loops 38 vertically spaced when in the orientation of FIG. 4 and offset in order to hingedly engage the free ends 34 of each of the horizontal rods 32a, 32b and 32c of the rear portion 31. The three vertically aligned hinges 38, 34 thus formed allow 180° rotation about their common axis. A plurality of vertical spaced parallel rods 39 of varying length vertically traverse the front portion 36 and terminate at the perimeter rod 37 in a firm assembly therewith. A reinforcing rod 40 traverses the front portion 36 and horizontally intersects each vertical rod 39. The rod 40 is attached to the perimeter rod 37 at approximately midway between the top and bottom of the front portion 36.

In order to secure the side members 16 and 17 and the partitions 18 in assembled position, means are provided for securing the sides 16 and 17 and partitions 18 to the base. Referring to FIG. 6, the rod 42 forms the perimeter of an elongated U-shaped saddle 43 which has spaced legs 43a and 43b interconnected by a straight portion 43c. The saddle 43 includes two such portions which are interconnected by longitudinally extending legs 43d and 43e, and the saddle 43 extends below the lower perimeter of the sides 16 and 17 and partitions 18.

A portion of the perimeter 19 of the base is offset to form a purchase detent 190 and a corresponding provision is made on each transverse rod 20 of the base 14. The saddle 43 is adapted to receive the corresponding leg in a gripping relation to firmly secure the sides 16 and 17 and partitions 18 to the base 14. When thus engaged, the sides and partitions are in orthogonal relationship with the back and base. By the application of an upward force normal to the base, the sides 16 and 17 and partitions 18 may be selectively disengaged from the base. The unit is designed so that under the demands of utilization the movement of the transporting vehicle in which the storage rack is placed will not generate a sufficient displacement force to move the components of the unit out of assembled relation. Thus accidental disengagement will not occur.

To effect disassembly, the user must apply a selective force sufficient to displace the parts. FIGS. 5 and 7 demonstrate how, when the securing means 43-19 is disengaged, the storage rack 10 can be collapsed into a compact arrangement. Each partition 18 pivots on hinge 26, folding toward the back 15. The left side 17 pivots on hinges 33 and 34 to fold upon itself inwardly of the rest of the rack 10. When both sides 16 and 17 and all partitions 18 are folded against the back 15, the back 15 then pivots on hinges 41 to lie substantially flat against the base 14. A plan view showing the sides 16 and 17 and partitions 18 folded inside the base 14 and back 15 is shown in FIG. 8. When thus collapsed or knocked-down, the rack 10 can be conveniently stored in the trunk of a car requiring much less space then when in rigid secured form. This collapsed form is also convenient for packaging and sale of the storage rack 10.

Although various minor modifications may be suggested by those versed in the art, it should be understood that we wish to embody within the scope of the patent warranted hereon all such modifications as reasonably and properly come within the scope of our contribution to the art.

The embodiments of the invention in which an exclusive property or privilege is claimed are defined as follows:

1. A collapsible portable knock-down storage rack for minimizing movement of packages during transport which comprises:

a rod-form rectangular back having a length longer than its height;

a rod-form rectangular base having a length equal to the length of said back, and a width less than said length;

two sides;

a plurality of partitions;

said back and said base being further comprised of a perimeter formed by a rod formed into a rectangle and a plurality of equally spaced apart straight rods parallelly transversing said height of said back and said width of said base, said rods terminating at points of intersection with the perimeters of said base and said back and joined to the respective perimeters at said points;

first hinge means for connecting said base to said back comprising eye-bolt shaped rods each having a curved portion and a straight portion, said straight portion attached at its end to said base at a point on one of the longer sides of the perimeter and extending upwardly therefrom, and said curved portion enclosing the rod forming the perimeter of said back along the length thereof;

said partitions and a first one of said sides further comprising a rod-form member generally forming three sides of a square, with one corner thereof rounded in the manner of an arc of a circle having its center in approximate coincidence with the center of said square, and the free ends of said rod-form member being curved in eye-bolt fashion so as to accept an adjoining rod-form member forming the perimeter of the back or one of the straight rod-form members transversing said back;

a second of said sides formed of the same general shape of said first sides further including a second hinge means allowing said second side to bend 180° along an axis parallel to said back and, said second hinge means located approximately one-half of the distance from the free ends of said side to the portion of the perimeter of said side parallel to said back;

said straight portion of said first hinge means extending vertically a distance above said base so that said back may be swiveled to a position parallel said base with said partitions and sides folded therebetween; and a means for temporarily securing each of said sides and said partitions to said base to maintain said rack in a rigid, upright position by preventing movement of said curved portions of said rod-form members around said enclosed rod-form members.

2. The article of claim 1 in which the means for temporarily securing said sides and said partitions to said base is comprised of a rod bent to form a perimeter of an elongated saddle, said saddle fitting over a portion of the respective perimeters of said sides and said partitions closest to said base, and said saddle clipping between its sides a rod parallelly transversing said base.

* * * * *